(12) United States Patent
Ohtani et al.

(10) Patent No.: US 6,571,921 B2
(45) Date of Patent: Jun. 3, 2003

(54) MOTOR-DRIVEN DISK BRAKE

(75) Inventors: Yukio Ohtani, Kanagawa-ken (JP); Tohma Yamaguchi, Tokyo (JP); Takuya Usui, Kanagawa-ken (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/866,775

(22) Filed: May 30, 2001

(65) Prior Publication Data
US 2002/0023806 A1 Feb. 28, 2002

(30) Foreign Application Priority Data
May 31, 2000 (JP) .................................... 2000-163121

(51) Int. Cl.$^7$ ............................................. F16D 55/08
(52) U.S. Cl. .................... 188/72.1; 188/72.7; 188/156; 188/2 D
(58) Field of Search ................................ 188/72.7, 72.1, 188/156, 71.8, 72.8, 2 D

(56) References Cited

U.S. PATENT DOCUMENTS

| 4,159,754 A | * | 7/1979 | Airheart et al. | 188/106 F |
| 4,487,295 A | * | 12/1984 | Mitchell | 188/106 F |
| 5,148,894 A | * | 9/1992 | Eddy, Jr. | 188/72.6 |
| 5,348,123 A | * | 9/1994 | Takahashi et al. | 188/162 |
| 5,785,157 A | * | 7/1998 | Scott et al. | 188/156 |
| 5,957,246 A | * | 9/1999 | Suzuki | 188/1.11 L |
| 6,382,741 B1 | * | 5/2002 | McCann et al. | 188/265 |
| 6,386,338 B1 | * | 5/2002 | Powrozek | 188/106 P |
| 6,401,879 B1 | * | 6/2002 | Drennen et al. | 188/158 |
| 6,412,608 B1 | * | 7/2002 | Mohr et al. | 188/156 |

FOREIGN PATENT DOCUMENTS

JP 2546348 5/1997

* cited by examiner

Primary Examiner—Douglas C. Butler
Assistant Examiner—Benjamin A. Pezzlo
(74) Attorney, Agent, or Firm—Wenderoth, Lind & Ponack, L.L.P.

(57) ABSTRACT

A motor-driven disk brake is capable of functioning as a parking brake satisfactorily without degrading the brake operating feeling and impairing the function of operating as a motor-driven brake. A stator and rotor of an electric motor are provided in a caliper body floatably supported on a carrier. The rotation of the rotor is transmitted to a piston after being converted into rectilinear motion through a ball-and-ramp mechanism and an adjusting nut. The piston, together with a claw member, presses brake pads against a disk rotor. A rotation assisting device is provided between the rear end of the rotor and a motor casing. A rotary disk constituting the rotation assisting device is rotated through a wire extending from an external operating member.

10 Claims, 10 Drawing Sheets

MOTOR-DRIVEN DISK BRAKE

BACKGROUND OF THE INVENTION

The present invention relates to a motor-driven disk brake for vehicles that produces braking force by using a rotational torque generated from an electric motor. More particularly, the present invention relates to a motor-driven disk brake having an additional function to operate also as a parking brake.

A conventional motor-driven disk brake has a caliper body floatably supported on a carrier secured to a non-rotating part of a vehicle. The caliper body contains a piston, an electric motor, and a rotary-to-rectilinear motion converting mechanism for converting the rotation of the rotor of the motor into rectilinear motion and for transmitting it to the piston. A torque generated on the rotor by the operation of the electric motor is converted into thrust for the piston through the rotary-to-rectilinear motion converting mechanism to press brake pads against a disk rotor, thereby generating braking force.

In the motor-driven disk brake of the type described above, the pedal force or stroke applied to the brake pedal by the driver is detected with a sensor, and the rotation (rotational angle) of the electric motor is controlled according to the detected value, thereby obtaining desired braking force. In the event a failure occurs in the electrical system, it becomes impossible to brake the vehicle.

Accordingly, Japanese Utility Model Registration No. 2546348, for example, proposes a mechanical brake actuating mechanism in which a rotating shaft is connected to the above-described rotary-to-rectilinear motion converting mechanism through a clutch mechanism and a ball-and-ramp mechanism. When an external rotational force is applied to the rotating shaft by a lever operation, for example, the clutch mechanism is engaged through the ball-and-ramp mechanism to actuate the rotary-to-rectilinear motion converting mechanism, thereby generating braking force. The mechanical brake actuating mechanism is useful as a parking brake as well as effective as a safety measure in the event of a failure in the electrical system.

However, according to the mechanical brake actuating mechanism described in the above-mentioned gazette, the relationship between the braking force and the rotational angle (input angle) of the rotating shaft to which rotational force is externally inputted varies according to the piston position at the time of initiating an external operation (e.g. a lever operation). Accordingly, if the driver performs an external operation while stepping on the brake pedal, the input angle varies to a considerable extent according to the piston position, resulting in variations in the brake operating quantity. This causes the brake operating feeling to be degraded markedly. Conversely, if the brake pedal is stepped on in a state where the parking brake has been put in operation by an external operation, the motor-driven brake is unable to work because the rotary-to-rectilinear motion converting mechanism is operatively connected to an external operating member through the clutch mechanism. Consequently, the desired braking force cannot be obtained.

In addition, the external input transmitted to the piston is influenced by frictional force in the clutch mechanism and the rotary-to-rectilinear motion converting mechanism. Therefore, if the frictional force changes with time, braking force also changes. Consequently, it is difficult to obtain stable braking force for a long period of time.

The present invention was made to solve the above-described problems.

An object of the present invention is to provide a motor-driven disk brake capable of functioning as a parking brake satisfactorily without degrading the brake operating feeling and impairing the function of operating as a motor-driven brake and also capable of ensuring long-term braking stability.

SUMMARY OF THE INVENTION

The present invention provides a motor-driven disk brake having a pair of brake pads disposed at both sides, respectively, of a disk rotor. A piston is provided in a caliper body to face one of the pair of brake pads. A claw portion is provided on the caliper body to extend over the disk rotor so as to face the other of the pair of brake pads. The motor-driven disk brake further has an electric motor for rotating a rotor and a rotary-to-rectilinear motion converting mechanism for converting rotational motion of the rotor into rectilinear motion to move the piston forward or backward. A torque generated on the rotor by the operation of the electric motor is converted into thrust for the piston through the rotary-to-rectilinear motion converting mechanism to press the brake pads against the disk rotor, thereby generating braking force. The motor-driven disk brake has a rotation assisting device for transmitting an external input directly to the rotor to rotate the rotor through a predetermined angle in a direction such that the piston is propelled. The rotation assisting device allows the rotor to rotate in excess of the predetermined angle.

In the motor-driven disk brake arranged as stated above, the rotor is allowed to rotate freely in the direction such that the piston is propelled. Therefore, the externally applied brake operating quantity can be kept constant independently of the piston position. In addition, the function of operating as a motor-driven brake is ensured. Moreover, because the rotor is rotated directly by the rotation assisting device, it is possible to ignore friction variations in the rotary-to-rectilinear motion converting mechanism.

In addition, the present invention provides a motor-driven disk brake having a pair of brake pads disposed at both sides, respectively, of a disk rotor. A piston is provided in a caliper body to face one of the pair of brake pads. A claw portion is provided on the caliper body to extend over the disk rotor so as to face the other of the pair of brake pads. The motor-driven disk brake further has an electric motor for rotating a rotor and a rotary-to-rectilinear motion converting mechanism for converting rotational motion of the rotor into rectilinear motion to move the piston forward or backward. Further, the motor-driven disk brake has an operating member for parking and a rotation assisting device for allowing the rotor of the electric motor to be mechanically rotated by the operating member for parking. The rotation assisting device converts a torque generated on the rotor into thrust for the piston through the rotary-to-rectilinear motion converting mechanism to press the brake pads against the disk rotor, thereby generating braking force.

DETAILED DESCRIPTION OF THE PREFERRED EMBODIMENTS

Figure 1:
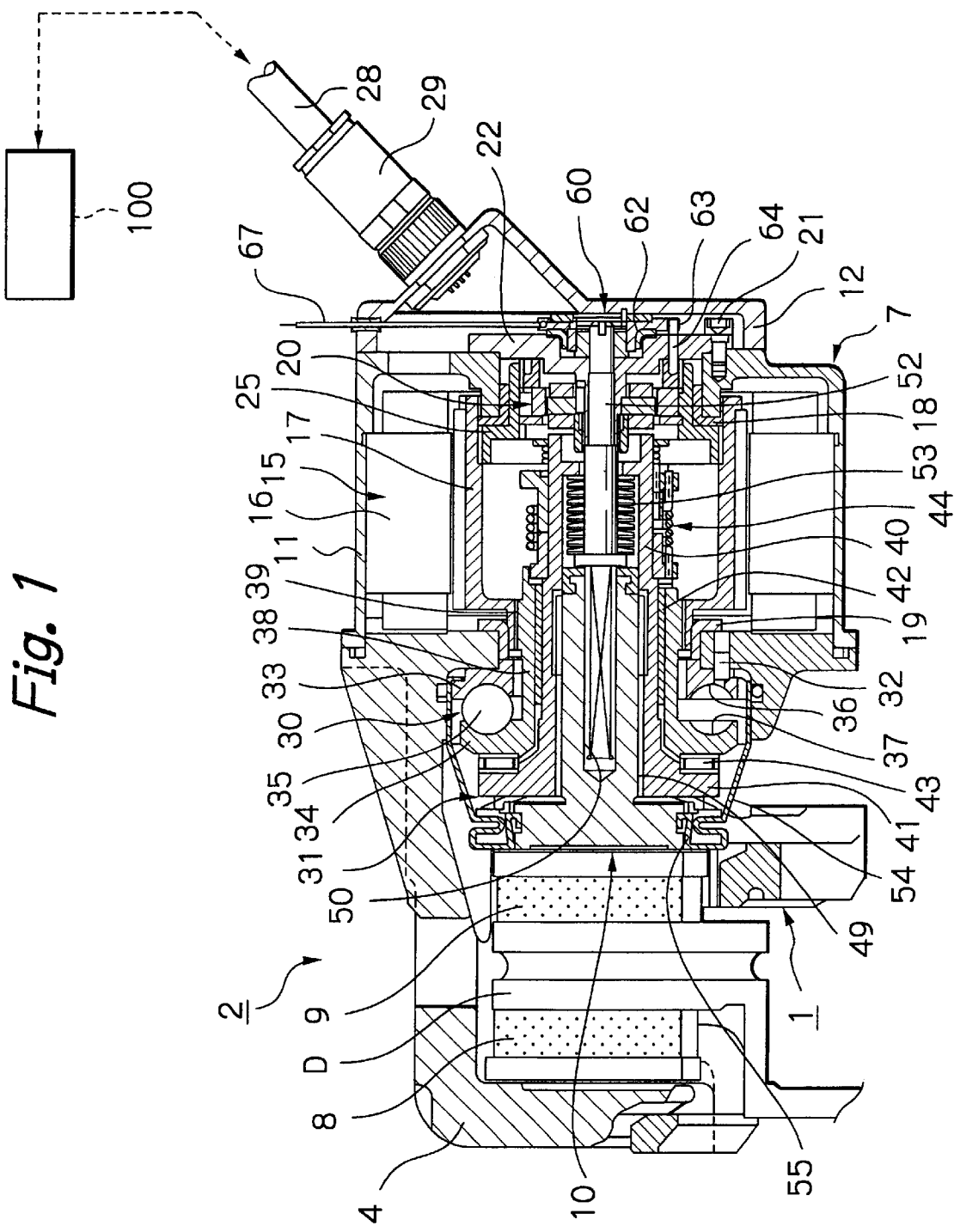
FIG. 1 is a sectional view showing the overall structure of a motor-driven disk brake according to a first embodiment of the present invention.

Embodiments of the present invention will be described below in detail with reference to the accompanying drawings.

FIGS. 1 to 4 show a first embodiment of the motor-driven disk brake according to the present invention. In these figures, a carrier 1 is secured to a non-rotating part (e.g. a knuckle) of a vehicle located at the inner side of a disk rotor D relative to the vehicle. A caliper body 2 is supported by the carrier 1 through two (left and right) slide pins 3 so as to be floatingly movable in the axial direction of the disk rotor D. The caliper body 2 includes an approximately C-shaped claw member (claw portion) 4 disposed to extend over the disk rotor D. The caliper body 2 further includes a motor casing 7 secured to an annular flange 5 (see FIG. 4) at the rear end of the claw member 4 by using bolts 6. The carrier 1 supports a pair of brake pads 8 and 9 disposed at both sides of the disk rotor D in such a manner that the brake pads 8 and 9 are movable in the axial direction of the disk rotor D. The claw member 4 is able to abut on the outer brake pad 8, which is located at the outer side of the disk rotor D relative to the vehicle. A piston 10 (described later) provided in the caliper body 2 is able to abut on the inner brake pad 9, which is located at the inner side of the disk rotor D relative to the vehicle. It should be noted that the motor casing 7 is formed from an approximately cylindrical casing body 11 and a cover 12 secured to the rear end of the casing body 11 by using bolts 13. The exposed portions of the slide pins 3 are covered with boots 14, respectively.

An electric motor 15 is installed in the motor casing 7. The electric motor 15 has a stator 16 secured to an inner peripheral portion of the motor casing 7 and a cylindrical rotor 17 disposed inside the stator 16. The rotor 17 is rotatably supported by the motor casing 7 through sliding bearings 18 and 19. The electric motor 15 is operated to rotate the rotor 17 through a desired angle with a desired torque according to an instruction from a controller 100. The rotational angle of the rotor 17 is detected with a rotation detector 20 provided in the motor casing 7. The rotation detector 20 has a resolver stator 23 and a resolver rotor 24.

The resolver stator 23 is secured to a resolver casing 22 attached to the motor casing 7 with bolts 21. The resolver rotor 24 is secured to the rotor 17 so as to face the resolver stator 23.

It should be noted that the resolver rotor 24 is secured to the inner side of a cylindrical member 25 press-fitted to an open end portion of the rotor 17. The resolver rotor 24 is fixed with a retaining ring 26 fitted to the inner periphery of the cylindrical member 25 and a nut (connecting nut) 27. Signal cables 28 are attached to the motor casing 7 by using connectors 29. The signal cables 28 electrically connect the controller 100 with the stator 16 of the electric motor 15 and the rotation detector 20.

The claw member 4 is provided therein with a ball-and-ramp mechanism (rotary-to-rectilinear motion converting mechanism) 30 and an adjusting nut 31. The ball-and-ramp mechanism 30 transmits the rotation of the rotor 17 of the electric motor 15 to the piston 10 after converting it into rectilinear motion.

The ball-and-ramp mechanism 30 includes an annular fixed disk 33 and a movable disk 34. The fixed disk 33 is fixed to the flange 5 of the claw member 4 with pins 32 so as not to rotate. The movable disk 34 is disposed to face the fixed disk 33. A plurality of balls 35 (steel balls) are interposed between the fixed disk 33 and the movable disk 34. The mutually opposing surfaces of the disks 33 and 34 are formed with three pairs of arcuate ball grooves 36 and 37 extending along the circumferential direction. The balls 35 are rollably placed in the three pairs of ball grooves 36 and 37. The ball grooves 36 and 37 of the ball-and-ramp mechanism 30 are sloped so that when the three balls 35 roll within the ball grooves 36 and 37 in response to relative rotation of the two disks 33 and 34, the spacing between the disks 33 and 34 changes according to the relative rotation.

The movable disk 34 is integrally formed with a cylindrical portion 38 extending through the fixed disk 33 as far as the inside of the motor casing 7. The cylindrical portion 38 is connected to an inner peripheral portion of the rotor 17 through splines 39. Thus, the movable disk 34 rotates together with the rotor 17 as one unit and, at the same time, is movable axially relative to the rotor 17. It should be noted that the splines 39 are provided with a predetermined clearance in each of the rotational and radial directions in consideration of slidability in the axial direction, size tolerance, and assembleability.

The adjusting nut 31 has a cylindrical portion 40 and a flange portion 41 formed on the outside of one end of the cylindrical portion 40. The cylindrical portion 40 extends through the cylindrical portion 38 of the movable disk 34. The cylindrical portion 40 of the adjusting nut 31 is rotatably supported by the cylindrical portion 38 through a sliding bearing 42. The flange portion 41 of the adjusting nut 31 is rotatably supported by one end portion of the movable disk 34 through a thrust bearing 43. The cylindrical portion 40 of the adjusting nut 31 is extended to a considerable extent as far as the inside of the rotor 17 in the motor casing 7. A limiter mechanism 44 is fitted on the outer periphery of the extended end of the cylindrical portion 40.

The limiter mechanism 44 has a limiter 45 and a spring holder 46. The limiter 45 is rotatably fitted on the distal end of the cylindrical portion 40 of the adjusting nut 31. The limiter 45 and the spring holder 46 are connected together by a coil spring 47. The limiter 45 and the spring holder 46 are engaged with each other so as to be rotatable relative to each other within predetermined limits. The coil spring 47 applies a predetermined set load to the limiter 45 and the spring holder 46 against the direction of rotation. The limiter 45 is rotatable clockwise (as viewed from the left-hand side in FIG. 1) relative to the spring holder 46 against the set load of the coil spring 47. An engagement projection 38a is formed on the distal end of the cylindrical portion 38 of the movable disk 34. The engagement projection 38a is loosely fitted in an engagement recess 45a formed on the limiter 45 (see FIG. 2), so that the limiter 45 is rotatable relative to the cylindrical portion 38 within predetermined limits. A clutch spring (coil spring) 48 is wound on the outer periphery of the distal end of the cylindrical portion 40 of the adjusting nut 31. One end of the clutch spring 48 is connected to the spring holder 46. The clutch spring 48 operates as a one-way clutch by torsional expansion and contraction in diameter to transmit only clockwise rotation of the spring holder 46 to the cylindrical portion 40 of the adjusting nut 31.

The piston 10 is in engagement with the adjusting nut 31 through a thread engagement mechanism 49. When the adjusting nut 31 rotates clockwise relative to the piston 10, the piston 10 advances toward the inner brake pad 9. The piston 10 is provided with an axial hole 50. A detent rod 52 is secured at one end thereof to the resolver casing 22 by using a nut 51. The other end portion of the detent rod 52 is inserted into the axial hole 50 of the piston 10 so that the piston 10 is axially slidable but nonrotatable. A coned disk spring 53 is interposed between a flange 52a formed on an intermediate portion of the detent rod 52 and an inward flange 40a formed on the inner periphery of the cylindrical portion 40 of the adjusting nut 31. The adjusting nut 31 is urged rightward as viewed in FIG. 1 by spring force from the coned disk spring 53.

It should be noted that the ball-and-ramp mechanism 30, the adjusting nut 31 and the piston 10 are accommodated in a single casing 54 together as one unit. The area between the front end of the casing 54 and the piston 10 is covered with a piston boot 55.

Figure 5A:
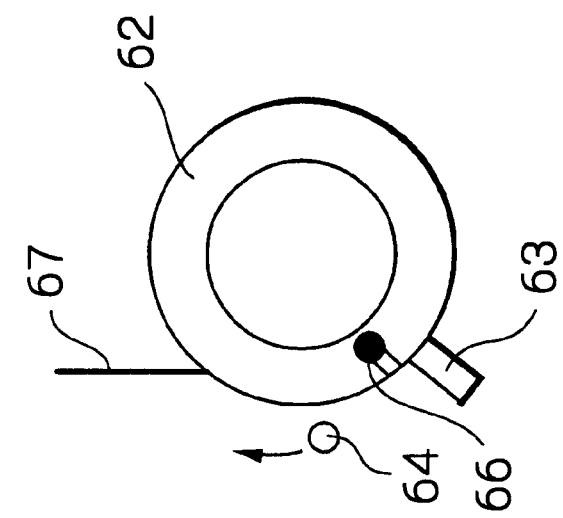
FIGS. 5A, 5B and 5C are schematic views showing the operation of a rotation assisting device in the first embodiment.
Figure 5B:
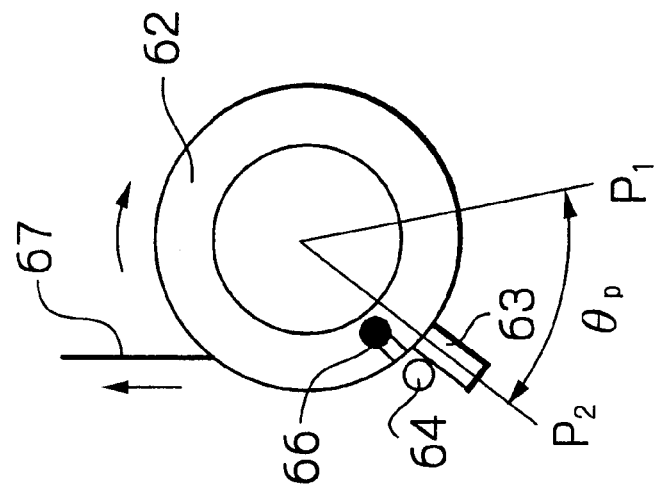
Figure 5C:
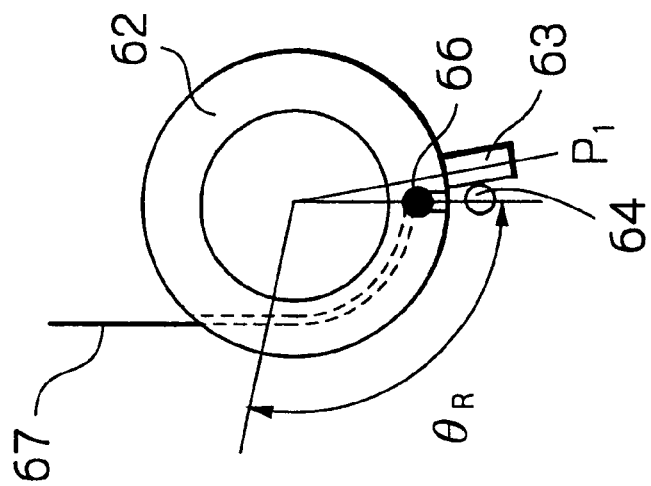

Meanwhile, a rotation assisting device 60 is provided between the cover 12 of the motor casing 7 and the resolver casing 22 of the rotation detector 20. The rotation assisting device 60 mechanically rotates the rotor 17 of the electric motor 15 to generate braking force. As shown in FIGS. 5A to 5C as well as FIGS. 1 and 2, the rotation assisting device 60 has a rotary disk 62 rotatably supported by the cover 12 and the resolver casing 22 through bearings 61. A projection (moving member) 63 is provided on the peripheral surface of the rotary disk 62. An engagement pin (rotation transmitting device) 64 is secured at the proximal end thereof to the nut 27, which is integrated with the rotor 17. The distal end portion of the engagement pin 64 axially extends through a groove in the resolver casing 22 as far as a position where it can come into and out of engagement with the projection 63. A torsion spring 65 normally urges the rotary disk 62 counterclockwise as viewed in FIGS. 5A, 5B and 5C.

Further, the rotary disk 62 has a wire mounting portion 66 provided at a position closer to the outer periphery of the rotary disk 62. An operating wire 67 is connected to the wire mounting portion 66. The wire 67 extends from an operating member 200 for parking provided in the passenger compartment, for example, and is led into the motor casing 7. The wire 67 extends through a sleeve 68 fitted in a peripheral edge portion of the cover 12. As shown in FIGS. 5A to 5C, the rotary disk 62 has an operating range $\theta_P$ set by the operating member 200 for parking so that the rotary disk 62 rotates between an original position $P_1$ (FIG. 5A) and a maximum operating position $P_2$ (FIG. 5B). The original position $P_1$ is defined by a position where the projection 63 is in contact with or slightly separate from the engagement pin 64 at the rear side of the latter in the rotational direction of the rotor 17 when the rotor 17 is in an inoperative state. The maximum operating position $P_2$ is where the projection 63 is positioned halfway in the operating range $\theta_R$ of the rotor 17.

The operation of the first embodiment will be described below.

The operation of the motor-driven disk brake when used as a motor-driven brake (regular brake) is as follows. When the brake pedal is stepped on, the controller 100 gives an instruction according to the amount of depression of the brake pedal. In response to the instruction from the controller 100, the rotor 17 of the electric motor 15 rotates clockwise. At this time, the projection 63 provided on the rotary disk 62 of the rotation assisting device 60 is outside the operating range $\theta_R$. Therefore, the rotor 17 rotates smoothly. As the rotor 17 rotates, the movable disk 34 of the ball-and-ramp mechanism 30 rotates through the splines 39, and the balls 35 roll along the ball grooves 36 and 37, causing the movable disk 34 to advance axially toward the inner brake pad 9. Consequently, the motion of the movable disk 34 is transmitted to the adjusting nut 31 through the thrust bearing 43 and further transmitted to the piston 10 through the thread engagement mechanism 49, causing the piston 10 to be propelled. The propulsion of the piston 10 causes the inner brake pad 9 to be pressed against the disk rotor D. Counterforce produced at this time causes the caliper body 2 to move backward. Consequently, the claw member 4 causes the outer brake pad 8 to be pressed against the disk rotor D, thus producing braking force according to the torque of the electric motor 15. It should be noted that the amount of propulsion L of the piston 10 at this time is $$L=\theta_R \times 1/2\pi$$

(where 1 is the lead of the ball grooves 36 and 37 of the ball-and-ramp mechanism 30) on the assumption that the rotor 17 has rotated to the full in the operating range $\theta_R$ (FIG. 5A).

By reducing the slope of the ball grooves 36 and 37 of the ball-and-ramp mechanism 30, the lead with respect to rotational displacement can be set sufficiently small, and hence the boosting ratio can be increased. Consequently, it becomes possible to minimize the output required for the electric motor 15 to produce. This allows a reduction in the power consumption and a reduction in size of the electric motor 15. Further, because three ball grooves 36 and three ball grooves 37 are provided on the fixed disk 33 and the movable disk 34, respectively, at equal spacings in the circumferential direction, thrust can be equally transmitted between the ball grooves 36 and 37. Therefore, no bending moment load occurs, and the brake pads 8 and 9 can be equally pressed against the disk rotor D. Accordingly, stable braking force can be obtained. Thus, it is possible to reduce the bending moment load acting on the support portions of the fixed disk 33 and the movable disk 34 and hence possible to minimize the required mechanical strength. As a result, it becomes possible to achieve size and weight reduction of each constituent part.

In addition, the ball-and-ramp mechanism 30 for driving the brake pads 8 and 9 at both sides of the disk rotor D is placed adjacent to the disk rotor D and secured to the inner side of the approximately C-shaped claw member 4, and the electric motor 15 is installed outside the ball-and-ramp mechanism 30. Accordingly, the ball-and-ramp mechanism 30 and the brake pads 8 and 9 can be positioned sufficiently close to each other, so that thrust can be transmitted directly to the brake pads 8 and 9 through the claw member 4. Thus, the motor casing 7 of the electric motor 15 will not directly receive the load applied during braking. Therefore, it is possible to reduce the wall thickness of the motor casing 7 and to use a lightweight material therefor. Accordingly, it is possible to achieve weight reduction and to promote dissipation of heat from the electric motor 15. Further, because counterforce produced during braking does not directly act on the bearing portions of the rotor 17, it is possible to simplify the structure of the bearing portions of the electric motor 15.

To release the brakes, the rotor 17 of the electric motor 15 is reversed to cause the movable disk 34 to rotate counterclockwise until it reaches the previous inoperative position. Consequently, the movable disk 34, the adjusting nut 31 and the piston 10 are moved backward by the spring force of the coned disk spring 53. As a result, the brake pads 8 and 9 separate from the disk rotor D, thus releasing the brakes.

If the brake pad 9 has become worn, even when the piston 10 (brake pad 9) is caused to move through a distance corresponding to the pad clearance from the non-braking position by clockwise rotation of the rotor 17 during braking, the piston 10 cannot press the brake pad 9 because of the wear of the brake pad 9. When the rotor 17 further rotates, the movable disk 34 and the adjusting nut 31 advance toward the disk rotor D, causing the piston 10 to bring the brake pad 9 into contact with the disk rotor D. Meanwhile, the engagement projection 38*a* formed at the end of the cylindrical portion 38 of the movable disk 34 causes the limiter 45 of the limiter mechanism 44 to rotate clockwise, and the rotational force of the limiter 45 is transmitted to the adjusting nut 31 through the coil spring 47, the spring holder 46 and the clutch spring 48. However, because the piston 10 does not press the brake pad 9 and there is no large frictional force occurring in the thread engagement mechanism 49 between the piston 10 and the adjusting nut 31, the adjusting nut 31 rotates clockwise, causing the piston 10 to further advance toward the brake pad 9 relative to the adjusting nut 31, thereby adjusting the brake system to the wear of the pad.

When the piston 10 moves to the position where it presses the brake pad 9 against the disk rotor D, large frictional force occurs in the thread engagement mechanism 49 between the piston 10 and the adjusting nut 31, and the coil spring 47 of the limiter mechanism 44 is deflected. As a result, the rotation of the adjusting nut 31 stops. At the time of releasing the brakes, when the piston 10 moves backward to the non-braking position in response to counterclockwise rotation of the rotor 17, the engagement projection 38*a* abuts on one end of the engagement recess 45*a* and causes the limiter 45 to rotate counterclockwise. However, the coil spring 47 expands its diameter and thus permits the limiter 45 to rotate in vain. Therefore, the adjusting nut 31 does not rotate. In this way, the gap between the brake pad 9 and the piston 10 in the non-braking position resulting from the wear of the brake pad 9 is reduced. Thus, the piston 10 can be advanced toward the brake pad 9 from the adjusting nut 31 by a fixed proportion to the distance corresponding to the wear of the brake pad 9 per braking operation. Repeating this operation allows the brake system to be adjusted to the wear of the pad.

Regarding the adjustment to the wear of the pad, see U.S. patent application Ser. No. 09/539,316, filed on Mar. 30, 2000. It should be noted that the subject matter contained in U.S. patent application Ser. No. 09/539,316 is incorporated herein by reference in its entirety.

The operation of the motor-driven disk brake when used as a parking brake is as follows. When the operating member 200 for parking, which is provided in the passenger compartment, is actuated, the wire 67 is retracted. This causes the rotary disk 62 in the rotation assisting device 60 to rotate clockwise. The projection 63 of the rotary disk 62 revolves through a predetermined angle range $\theta_P$ from the original position $P_1$ shown in FIG. 5A to the maximum operating position $P_2$ shown in FIG. 5B. The revolving force is transmitted from the projection 63 to the rotor 17 through the engagement pin 64, the nut 27 and the cylindrical member 25 as rotational force, causing the rotor 17 to rotate through $\theta_P$ as well. As a result, the piston 10 is propelled through a distance $$L' = \theta_P \times 1/2\pi$$

(where 1 is the lead of the ball grooves 36 and 37 of the ball-and-ramp mechanism 30), whereby predetermined parking braking force is produced.

To release the parking brake, the operating member 200 for parking in the passenger compartment is returned to the previous position. This allows the rotary disk 62 to return to the original position $P_1$ (see FIG. 5A) by the spring force of the spiral spring 65. In response to the rotation of the rotary disk 62, the rotor 17 also returns to the previous position.

When the motor-driven brake is activated in a state where the parking brake has been put in operation, because the rotor 17 is allowed to rotate freely in the direction such that the piston 10 is propelled, the engagement pin 64 integrated with the rotor 17 separates from the projection 63 of the rotary disk 62, as shown in FIG. 5C, and the rotor 17 further rotates within the operating range $\theta_R$. Thus, the motor-driven disk brake operates as the regular brake.

When the parking brake is activated in a state where the motor-driven brake has been put in operation, the rotary disk 62 rotates freely without being interfered by the engagement pin 64 integrated with the rotor 17 because the operating range $\theta_P$ of the rotary disk 62 (projection 63) is set on the initial operation side of the operating range $\theta_R$ provided for the rotor 17 (engagement pin 64) to rotate when the motor-driven brake is activated. Thus, the parking brake is set.

Figure 6:
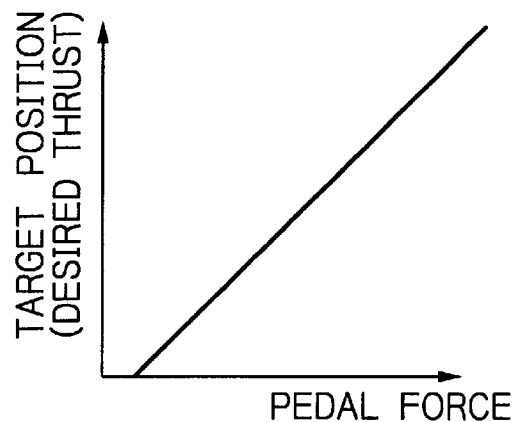
FIG. 6 is a graph showing the relationship between the brake pedal force and the target position, which is used in the control of the motor-driven disk brake.

Incidentally, the control of the electric motor 15 (rotor 17) by the controller 100 is effected by utilizing the proportional relationship between the pedal force and the target position (desired thrust) of the piston 10 shown in FIG. 6, by way of example.

Figure 7:
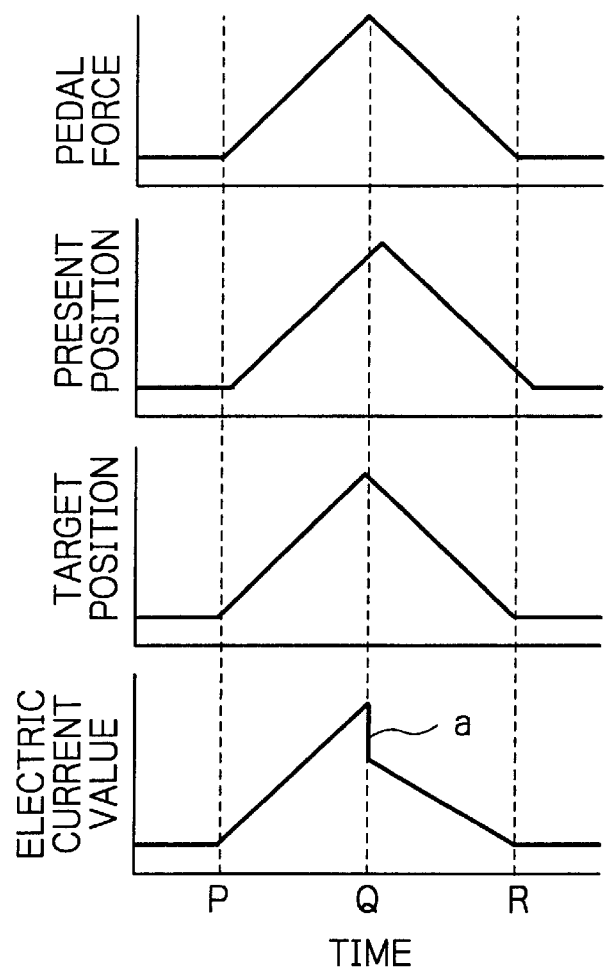
FIG. 7 is a time chart showing control conditions when the motor-driven disk brake is operated as a motor-driven brake.

When the motor-driven disk brake is used as the regular brake, as shown in the time chart in FIG. 7, the present position of the piston 10 and the target position thereof are substantially matched to each other, although there is some delay in the control of the present position of the piston 10. Thus, favorable controllability is obtained. It should be noted that reference symbols P, Q, and R in FIG. 7 denote braking initiation position, braking peak position, and braking release position, respectively. A slump a in the pattern of the value of electric current supplied to the electric motor 15 is a phenomenon occurring owing to the fact that resistance (friction) acting on the piston 10 during the forward stroke and that during the backward stroke are opposite in direction to each other.

Figure 8:
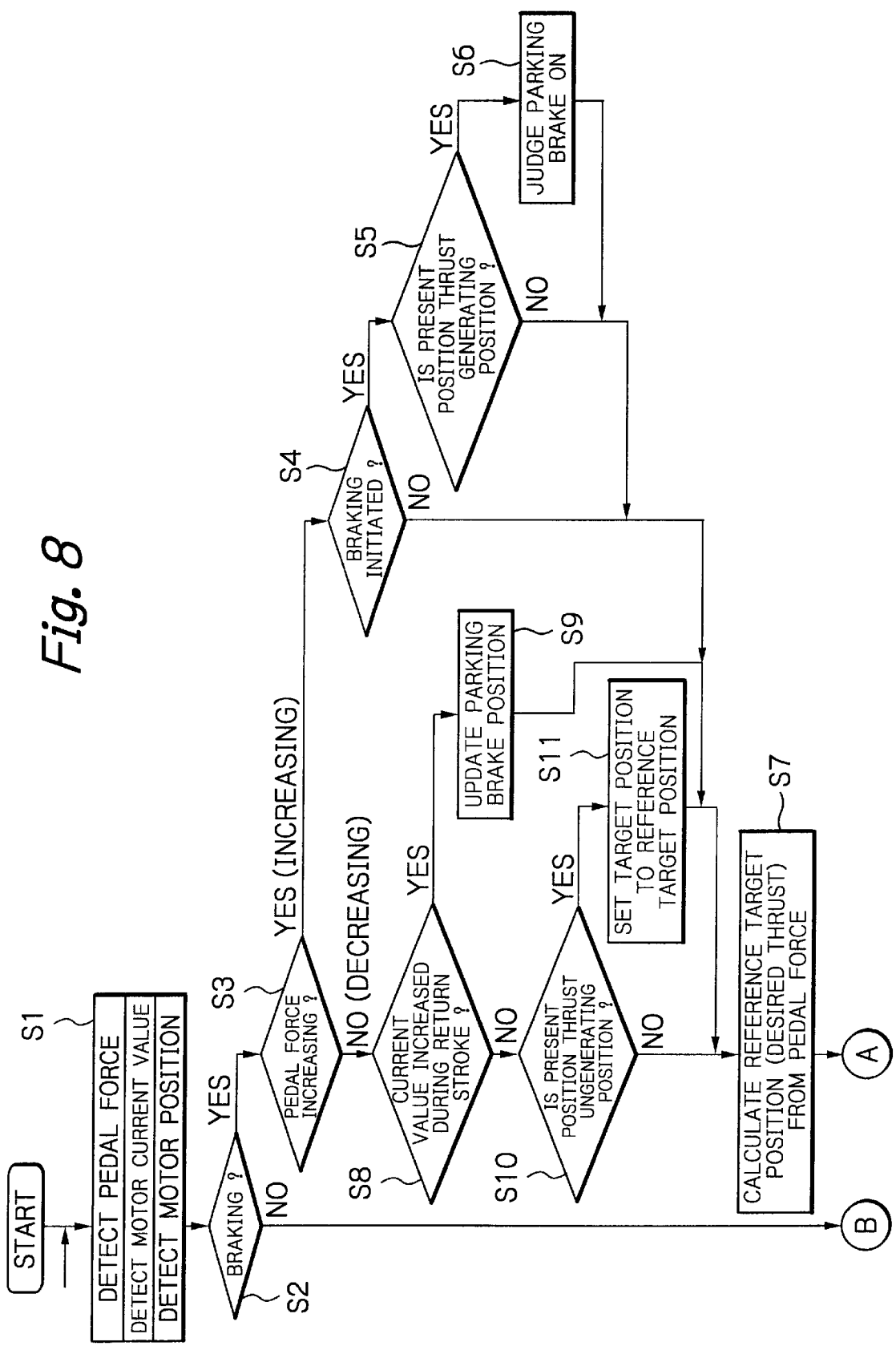
FIG. 8 is a flowchart showing the first half of the flow of control carried out when the motor-driven disk brake is used as both a parking brake and a motor-driven brake.
Figure 9:
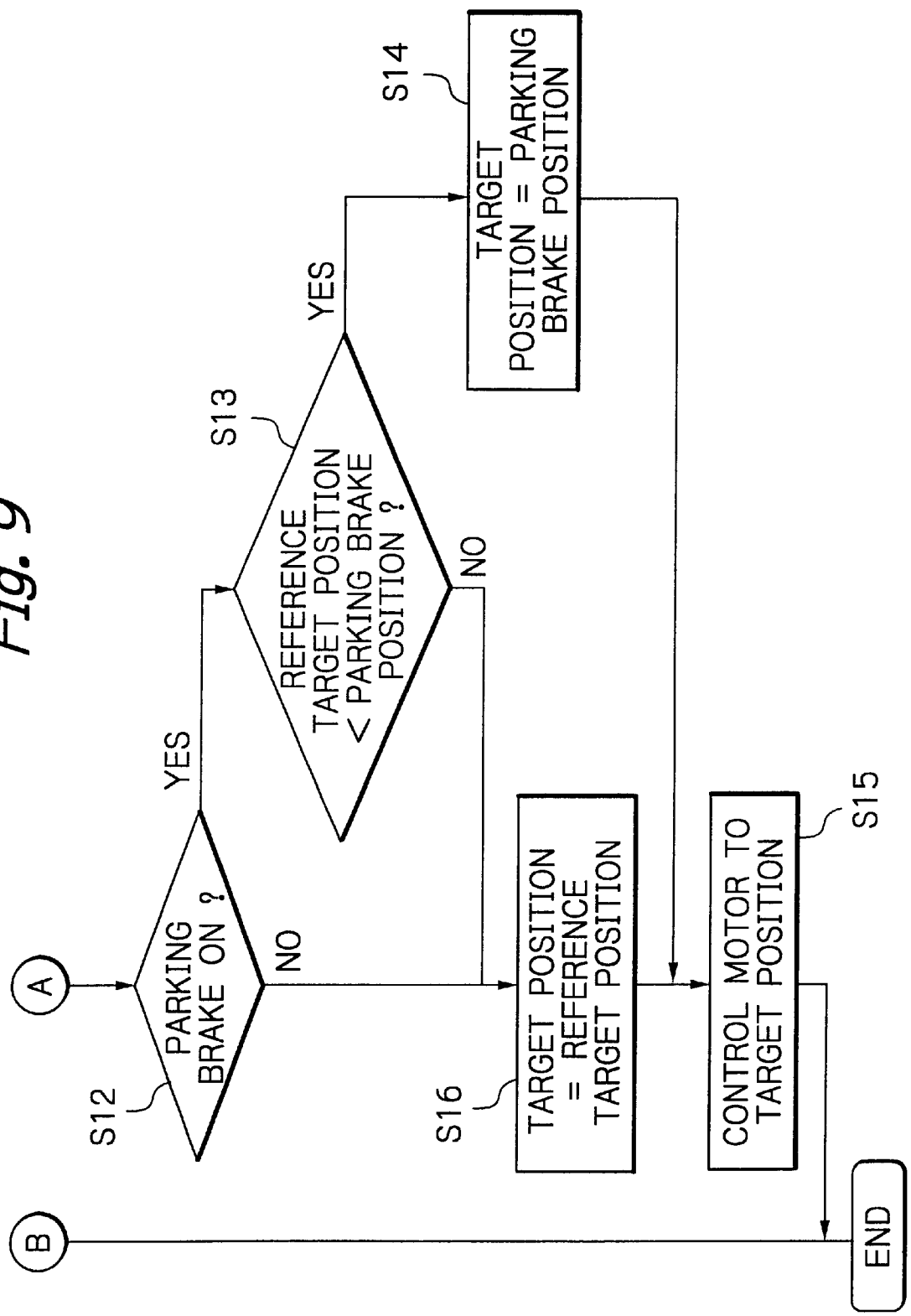
FIG. 9 is a flowchart showing the second half of the flow of control carried out when the motor-driven disk brake is used as both a parking brake and a motor-driven brake.

However, when the motor-driven brake is activated in a state where the parking brake has been put in operation, the position of the piston 10 when the motor-driven brake is activated differs from that in a case where the motor-driven disk brake is used as the regular brake. Therefore, a special procedure is required for the control of the electric motor 15. FIGS. 8 and 9 show an example of the flow of control carried out when the motor-driven disk brake is used as both a parking brake and a motor-driven brake.

When the driver steps on the brake pedal, first, the pressure applied to the brake pedal, i.e. pedal force, is detected with a pedal force sensor provided at the brake pedal at step S1. At the same time, the value of electric current supplied to the electric motor 15 and the present position thereof are detected. At the subsequent step S2, it is checked by the detected pedal force whether or not the driver has an intention of braking. If it is judged at step S2 that the driver has an intention of braking, a judgment is made at the subsequent step S3 as to whether the driver's intention is to increase or decrease the pedal force. If it is judged that the pedal force is increasing, a judgment is made at the subsequent step S4 as to whether or not braking has been initiated. If it is judged that braking has been initiated, a judgment is made at the subsequent step S5 as to whether or not the parking brake has been put in operation. In this regard, it is judged that the parking brake has been put in operation when the present position is the thrust generating position. If it is judged at step S5 that the parking brake has been put in operation, the present position is set to the parking brake position at step S6, and a parking brake ON flag is set to indicate that the parking brake has been put in operation. Then, the process proceeds to step S7, at which a reference target position (desired thrust) of the piston 10 is calculated from the pedal force according to the relationship shown in FIG. 6.

On the other hand, if it is judged at step S3 that the pedal force is decreasing, the parking brake position is detected at step S8 on the basis of an increase in the value of electric current to the electric motor 15 to detect whether or not the parking brake has been actuated during the operation of the brake pedal. If an increase in the electric current is detected at step S8, i.e. if the parking brake position is detected, the parking brake position is updated at the subsequent step S9. Then, the process proceeds to the above-described step S7. If a decrease in the electric current is detected at step S8, i.e. if the parking brake position is not detected, it is judged at step S10 whether or not the parking brake has been released, i.e. whether or not the present position is the thrust generating position. If the present position is judged to be the thrust generating position, the target position is set to a reference target position at step S11. Then, the process proceeds to the above-described step S7.

Thereafter, a judgment is made at step S12 as to whether the parking brake is ON or OFF from the parking brake ON flag. If the parking brake is ON, it is judged at step S13 whether or not the reference target position is less than the parking brake position. If the reference target position is less than the parking brake position, the target position is set to the parking brake position at step S14. Thereafter, the process proceeds to step S15, at which the electric motor 15 is controlled so that the target position is reached. If it is judged at step S12 that the reference target position is not less than the parking brake position, the process proceeds to step S16, at which the target position is set to the reference target position. Thereafter, the process proceeds to the above-described step S15. Thus, the electric motor 15 can be controlled effectively even when the brake pedal is stepped on in a state where the parking brake has been put in operation.

On the other hand, if it is judged at step S12 that the parking brake is OFF, the process proceeds to the above-described steps S16 and S15 successively. Thus, the electric motor 15 can be controlled effectively even when the brake pedal is stepped on in a state where the parking brake has been put in operation and then the brake pedal is released.

It should be noted that if it is judged at step S2 that the driver has no intention of braking from the detection of the pedal force, the control is stopped.

Figure 10:
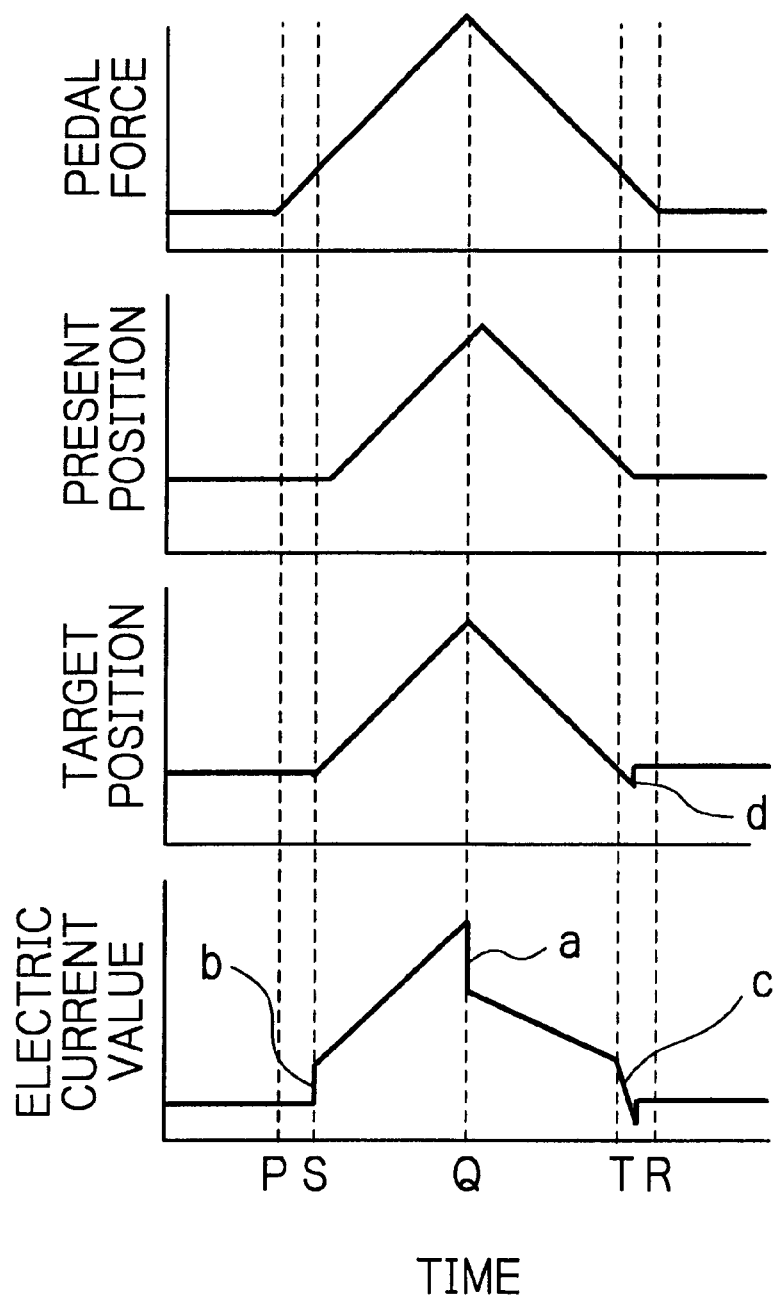
FIG. 10 is a time chart showing control conditions when the motor-driven disk brake is used as both a parking brake and a motor-driven brake.

FIG. 10 shows a time chart showing control conditions observed when the motor-driven brake is activated in a state where the parking brake has been put in operation. In the time chart, reference symbols S and T denote timing points for detecting the piston position when the brake pedal is stepped on in a state where the parking brake has been put in operation. When the reference target position reaches the position S of the piston 10 (parking brake position) in a state where the parking brake has been put in operation, the electric current value is increased as shown by reference symbol b. When the piston 10 returns to the parking brake position, the electric current value is reduced as shown by reference symbol c. In this way, the motor-driven disk brake is switched between the motor-driven brake and the parking brake. It should be noted that the point of inflection d in the target position curve shows that the target position has been corrected according to the drop c in the electric current.

Figure 2:
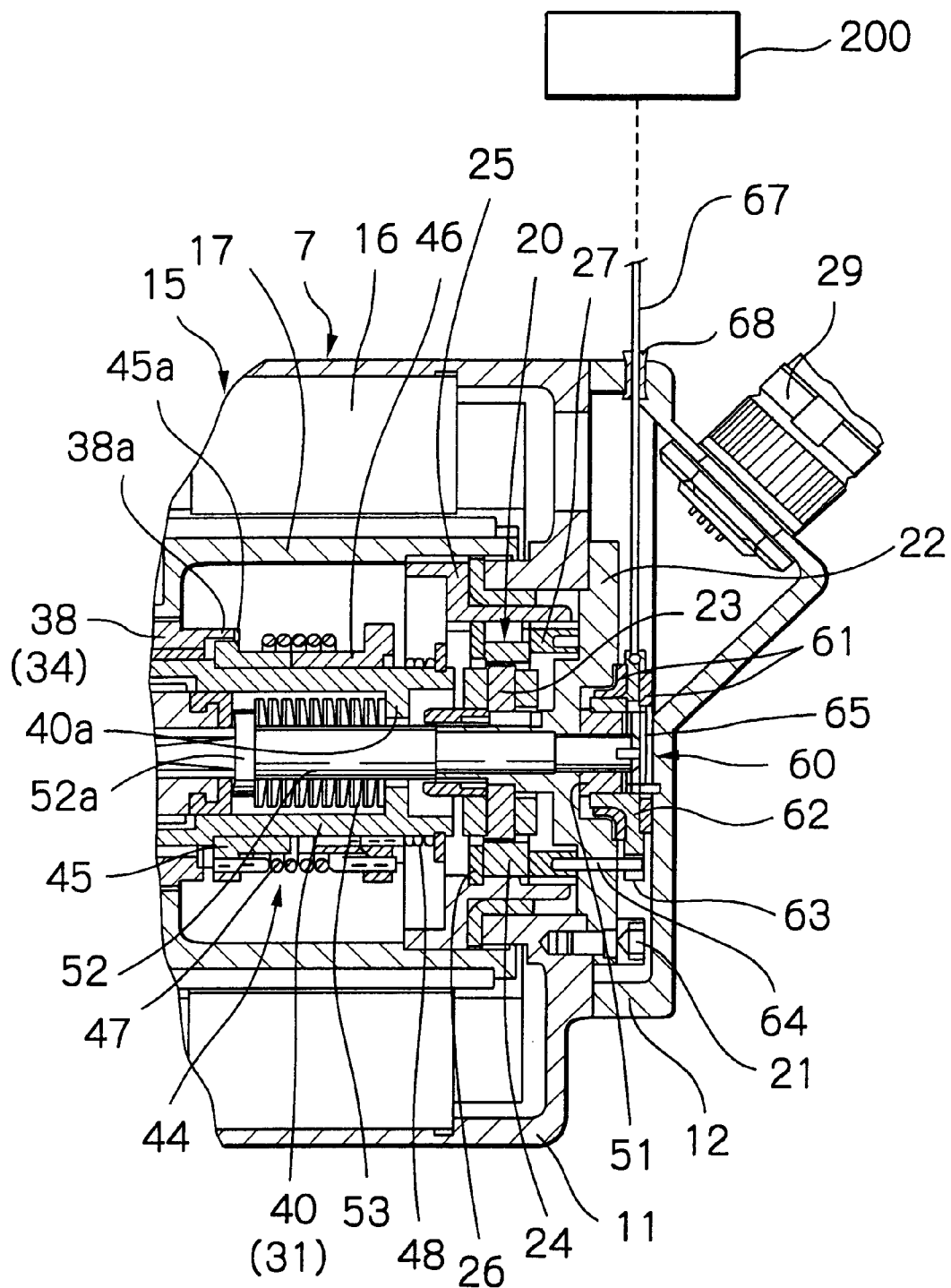
FIG. 2 is a sectional view showing an essential part of the motor-driven disk brake shown in FIG. 1.
Figure 3:
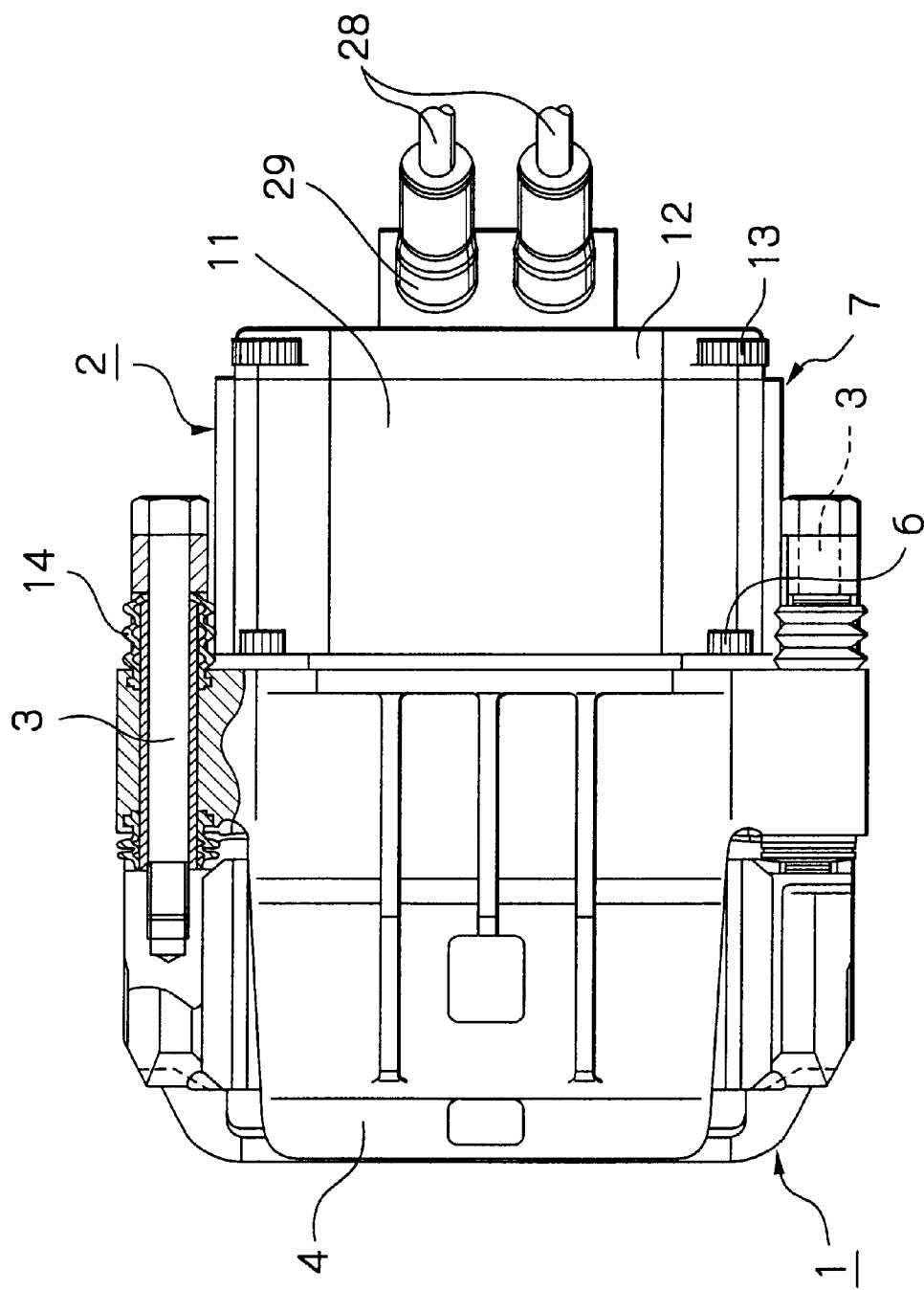
FIG. 3 is a partly-sectioned plan view showing the overall structure of the motor-driven disk brake shown in FIG. 1.
Figure 4:
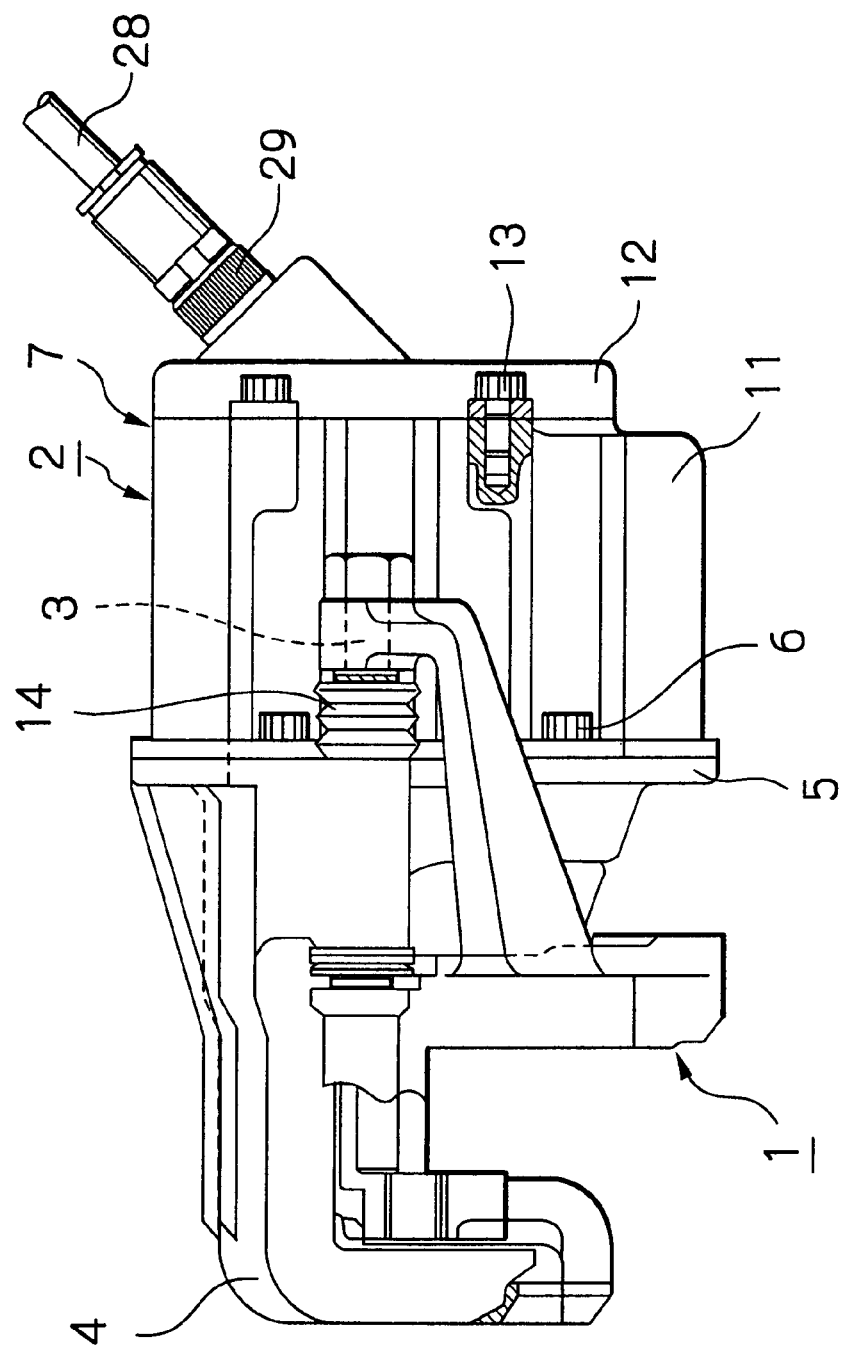
FIG. 4 is a partly-sectioned side view showing the overall structure of the motor-driven disk brake shown in FIG. 1.
Figure 11:
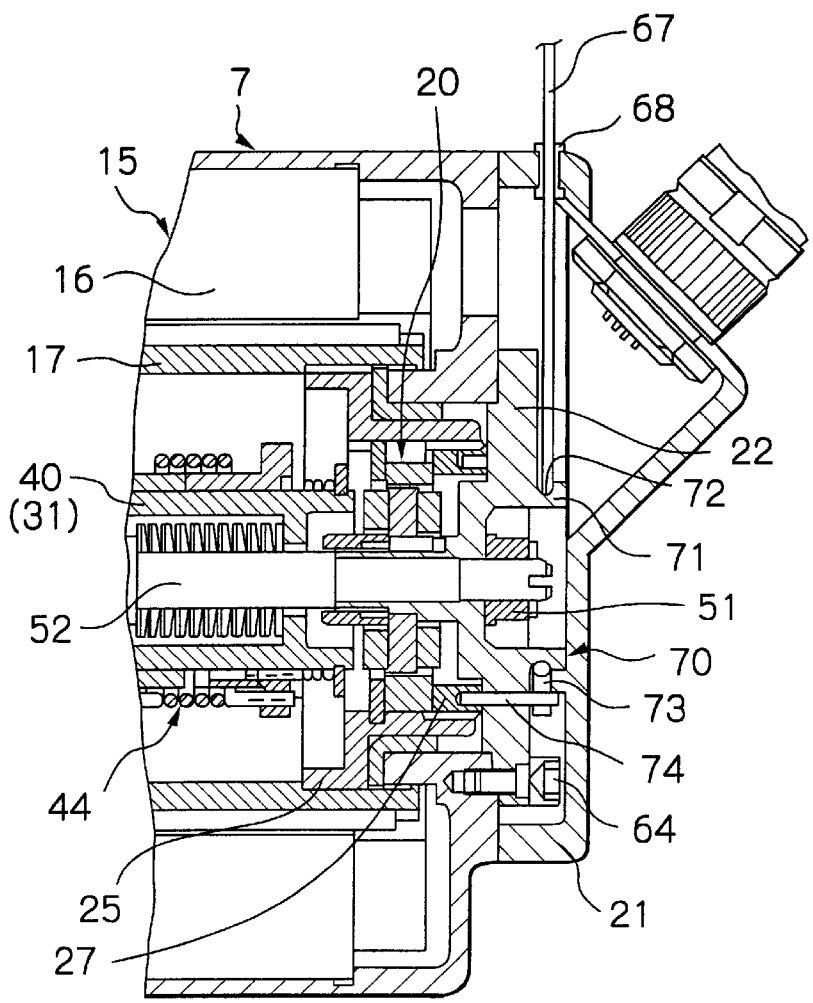
FIG. 11 is a sectional view showing the structure of an essential part of a motor-driven disk brake according to a second embodiment of the present invention.
Figure 12:
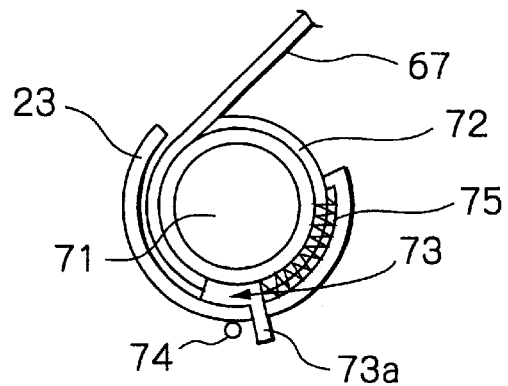
FIG. 12 is a front view showing the structure of a rotation assisting device in the second embodiment.

FIGS. 11 and 12 show a second embodiment of the present invention. It should be noted that the second embodiment is a modification of the above-described first embodiment, in which the arrangement of the rotation assisting device for actuating the parking brake is modified. The general arrangement as a brake booster is not different from that of the first embodiment. Therefore, the same portions and members as those shown in FIGS. 1 and 2 are denoted by the same reference numerals, and a description thereof is omitted.

A rotation assisting device 70 in the second embodiment has an annular groove 72 formed on the outer peripheral surface of a boss portion 71 integrally provided on the resolver casing 22. An L-shaped sliding member (moving member) 73 is slidably fitted in the annular groove 72. An engagement pin 74 is secured at the proximal end thereof to the nut 27 integrated with the rotor 17. The distal end portion of the engagement pin 74 extends axially through a groove provided in the resolver casing 22 to a position where it can come into and out of engagement with the sliding member 73. An extension spring 75 normally urges the sliding member 73 in the annular groove 72 counterclockwise as viewed in FIG. 12.

The operating wire 67 is connected to one end of the sliding member 73. The wire 67 is slidably guided through the annular groove 72. Retracting the wire 67 causes the sliding member 73 to revolve along the annular groove 72 clockwise as viewed in FIG. 12. The sliding member 73 is arranged to revolve through a range approximately the same as the operating range $\theta_P$ (FIG. 5B) of the projection 63 in the first embodiment. In this case, the original position of the sliding member 73 is defined by a position where a projection 73a at one end of the sliding member 73 is in contact with or slightly separate from the engagement pin 74 (FIG. 12) at the rear side of the latter in the rotational direction of the rotor 17 when the rotor 17 is in an inoperative state.

The operation of the rotation assisting device 70 is the same as that of the rotation assisting device 60 in the first embodiment. When the operating member 200 for parking, which is provided in the passenger compartment, is actuated, the wire 67 is retracted. This causes the sliding member 73 to revolve clockwise in FIG. 12 along the annular groove 72. In response to the revolution of the sliding member 73, the rotor 17 rotates to activate the parking brake. Thus, the rotation assisting device 70 requires only that the boss portion 71 having the annular groove 72 be added to the existing resolver casing 22. Accordingly, the second embodiment dispenses with the troublesome assembling operation as required for the rotation assisting device 60 in the first embodiment to support the rotary disk 62 with the bearings 61 (FIG. 2). Therefore, the second embodiment is advantageous in terms of costs.

As has been detailed above, the motor-driven disk brake according to the present invention is capable of functioning as a parking brake satisfactorily without degrading the brake operating feeling and impairing the function of operating as a motor-driven brake. In addition, the motor-driven disk brake is capable of ensuring long-term braking stability. Thus, the motor-driven disk brake according to the present invention is of great utility value.

The entire disclosure of Japanese Patent Application No. 2000-163121 filed on May 31, 2000 including specification, claims, drawings and summary is incorporated herein by reference in its entirety.

What is claimed is:

1. A motor-driven disk brake comprising:
   a pair of brake pads disposed at both sides, respectively, of a disk rotor;
   a piston provided in a caliper body to face one of said pair of brake pads;
   a claw portion provided on said caliper body to extend over said disk rotor so as to face the other of said pair of brake pads;
   an electric motor for rotating a rotor; and
   a rotary-to-rectilinear motion converting mechanism for converting rotational motion of said rotor into rectilinear motion to move said piston forward or backward, wherein a torque generated on the rotor by an operation of said electric motor is converted into thrust for said piston through said rotary-to-rectilinear motion converting mechanism to press said brake pads against said disk rotor, thereby generating braking force;
   said motor-driven disk brake further comprising:
      rotation assisting means for transmitting an external input directly to said rotor to rotate said rotor through a predetermined angle in a direction such that said piston is propelled, said rotation assisting means allowing said rotor to rotate in excess of said predetermined angle.

2. The motor-driven disk brake of claim 1, wherein said rotation assisting means includes:
   a moving member adapted to revolve approximately on a cylindrical surface with respect to an axis of said rotor in response to an external force applied thereto through an operating wire; and
   rotation transmitting means for transmitting a revolving force of said moving member to said rotor as a rotational force, said rotation transmitting means being capable of coming into and out of engagement with said moving member.

3. A motor-driven disk brake comprising:
   a pair of brake pads disposed at both sides, respectively, of a disk rotor;
   a piston provided in a caliper body to face one of said pair of brake pads;
   a claw portion provided on said caliper body to extend over said disk rotor so as to face the other of said pair of brake pads;
   an electric motor for rotating a rotor;
   a rotary-to-rectilinear motion converting mechanism for converting rotational motion of said rotor into rectilinear motion to move said piston forward or backward;
   an operating member for parking; and
   rotation assisting means for allowing the rotor of said electric motor to be mechanically rotated by said operating member for parking and for converting a torque generated on said rotor into thrust for said piston through said rotary-to-rectilinear motion converting mechanism to press said brake pads against said disk rotor, thereby generating braking force;
   wherein said rotation assisting means transmits an external input directly to said rotor to rotate said rotor through a predetermined angle in a direction such that said piston is propelled, and allows said rotor to rotate in excess of said predetermined angle.

4. The motor-driven disk brake of claim 3, further comprising:
   a controller for controlling an operation of said electric motor so that the torque generated on said rotor is converted into thrust for said piston through said rotary-to-rectilinear motion converting mechanism to press said brake pads against said disk rotor so as to generate braking force.

5. The motor-driven disk brake of claim 4, wherein said rotation assisting means includes:
   a moving member rotatable relative to said rotor, said moving member rotating in response to a force from said operating member for parking; and
   rotation transmitting means for transmitting a rotational force to said rotor, said rotation transmitting means being capable of coming into and out of engagement with said moving member.

6. The motor-driven disk brake of claim 5, wherein said moving member has:
   a rotary disk provided in coaxial relation to said rotor, said rotary disk being rotatable relative to said rotor; and
   a projection provided on a peripheral surface of said rotary disk;
   said rotation transmitting means having an engagement pin secured at a proximal end thereof to said rotor, a distal end portion of said engagement pin axially extending to a position where it is capable of coming into and out of engagement with said projection;
   said motor-driven disk brake further including means for urging said rotary disk toward an original position thereof.

7. The motor-driven disk brake of claim 6, wherein said rotor moves from an inoperative position to a maximum operating position in response to an instruction from said controller, thereby allowing said engagement pin provided on said rotor to move within a predetermined operating range;
   said rotary disk having an operating range set by said operating member for parking so as to move between the original position and a maximum operating position;
   wherein at said original position, the projection of said rotary disk is at a rear side of said engagement pin in a rotational direction of said rotor when said rotor is at the inoperative position;
   wherein at said maximum operating position, the projection of said rotary disk is located within the operating range of the engagement pin of said rotor.

8. The motor-driven disk brake of claim 7, wherein at said original position, the projection of said rotary disk is located outside the operating range of said engagement pin.

9. The motor-driven disk brake of claim 8, wherein said rotary disk is connected with an operating wire extending from said operating member for parking to rotate said rotary disk.

10. The motor-driven disk brake of claim 4, wherein said rotation assisting means includes a member fixedly provided in coaxial relation to said rotor, said member having a boss portion integrally provided thereon and an annular groove formed on an outer peripheral surface of said boss portion;
    said rotation assisting means including:
       an L-shaped sliding member slidably fitted in said annular groove;
       an engagement pin secured at a proximal end thereof to said rotor, a distal end portion of said engagement pin axially extending through a groove provided in said member to a position where it is capable of coming into and out of engagement with said sliding member; and
       an extension spring disposed in said annular groove to urge said sliding member toward an original position of said sliding member.

* * * * *